(12) United States Patent
Arain et al.

(10) Patent No.: US 11,676,255 B2
(45) Date of Patent: Jun. 13, 2023

(54) IMAGE CORRECTION FOR OPHTHALMIC IMAGES

(71) Applicant: Optos Plc, Dunfermline (GB)

(72) Inventors: Muzammil A. Arain, Albuquerque, NM (US); Jeffery Benshetler, Albuquerque, NM (US); Eugene Russiyanov, Albuquerque, NM (US); Tushar M. Ranchod, Albuquerque, NM (US)

(73) Assignee: Optos Plc, Dunfermline (GB)

( * ) Notice: Subject to any disclaimer, the term of this patent is extended or adjusted under 35 U.S.C. 154(b) by 0 days.

(21) Appl. No.: 17/401,957

(22) Filed: Aug. 13, 2021

(65) Prior Publication Data

US 2022/0180489 A1    Jun. 9, 2022

Related U.S. Application Data

(60) Provisional application No. 63/065,698, filed on Aug. 14, 2020.

(51) Int. Cl.
*G06T 5/50*       (2006.01)
*G06V 40/18*    (2022.01)
(Continued)

(52) U.S. Cl.
CPC .............. *G06T 5/50* (2013.01); *G06T 3/4007* (2013.01); *G06T 7/0014* (2013.01); *G06T 7/11* (2017.01);
(Continued)

(58) Field of Classification Search
CPC ........ G06K 9/6201; G06T 2207/30041; G06T 2207/10101; G06T 7/12; G06T 5/002; G06T 7/0012; G06T 1/00; G06T 11/003; G06T 2207/10004; G06T 2207/20081; G06T 3/4076; G06T 5/50; G06T 11/00; G06T 11/60; G06T 15/10; G06T 15/20; G06T 19/006; G06T 2207/20021;
(Continued)

(56) References Cited

U.S. PATENT DOCUMENTS

| | | | |
|---|---|---|---|
| 10,410,083 B2 * | 9/2019 | Yoshioka | G06V 10/426 |
| 2013/0321583 A1 * | 12/2013 | Hager | G06T 7/579 |
| | | | 348/46 |

(Continued)

*Primary Examiner* — Ming Wu
(74) *Attorney, Agent, or Firm* — DeLucia, Mlynar & Associates LLP

(57) ABSTRACT

Generating a correction algorithm includes obtaining a model of an eye, the model including a front portion with optics to mimic a cornea and a lens of a human eye, and a rear portion having a generally hemispherical-shaped body to mimic a retina of the human eye. The rear portion includes physical reference lines on an inside surface of the generally hemispherical-shaped body. Images of the model are captured using an image capturing device aimed at the model. Vertices of the physical reference lines are identified according to a given projection technique for displaying generally hemispherical-shaped body in a two-dimensional image in the captured images. Idealized placement of the vertices of the physical reference lines is obtained according to the given projection technique. The result is a correction algorithm used to adjust any pixel of an image of an actual eye in the x-axis and in the y-axis.

6 Claims, 15 Drawing Sheets

(51) Int. Cl.
*G06T 7/73* (2017.01)
*G06T 3/40* (2006.01)
*G06T 11/00* (2006.01)
*G06T 7/11* (2017.01)
*G06T 7/64* (2017.01)
*G06T 7/00* (2017.01)
*H04N 23/90* (2023.01)
*H04N 23/698* (2023.01)

(52) U.S. Cl.
CPC ............... *G06T 7/64* (2017.01); *G06T 7/73* (2017.01); *G06T 11/00* (2013.01); *G06V 40/193* (2022.01); *G06V 40/197* (2022.01); *H04N 23/698* (2023.01); *H04N 23/90* (2023.01); *G06T 2207/20021* (2013.01); *G06T 2207/20068* (2013.01); *G06T 2207/20081* (2013.01); *G06T 2207/20221* (2013.01); *G06T 2207/30041* (2013.01); *G06T 2207/30204* (2013.01)

(58) Field of Classification Search
CPC . G06T 2207/20068; G06T 2207/20084; G06T 2207/20172; G06T 2207/20221; G06T 2207/30204; G06T 2219/024; G06T 3/40; G06T 3/4007; G06T 5/003; G06T 5/006; G06T 5/007; G06T 7/0014; G06T 7/11; G06T 7/64; G06T 7/73
See application file for complete search history.

(56) References Cited

U.S. PATENT DOCUMENTS

2016/0014327 A1* 1/2016 Iwasaki ................. H04N 23/80
  348/349
2017/0032214 A1* 2/2017 Krenzer ................ G06V 40/19

* cited by examiner

Figure 1D — 100d
Figure 1E — 100e
Figure 1A — 100a
Figure 1B — 100b
Figure 1C — 100c

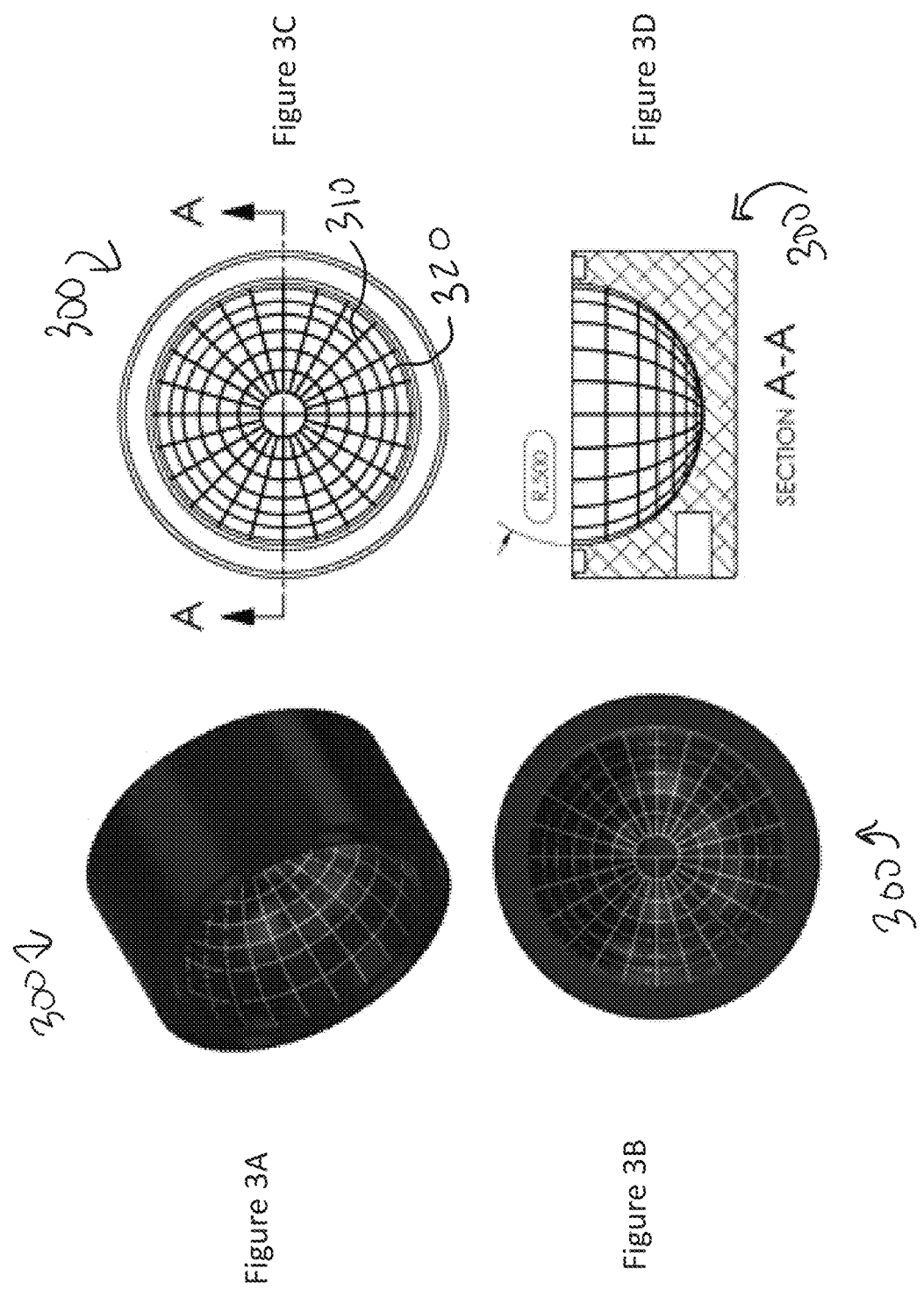

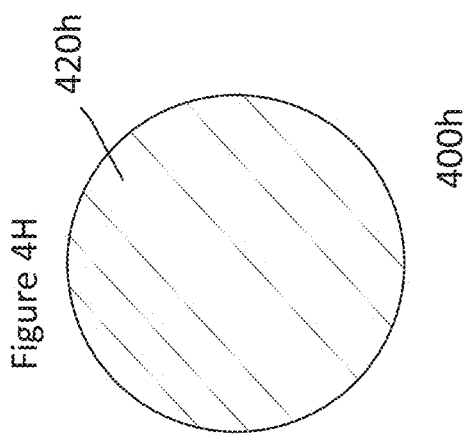
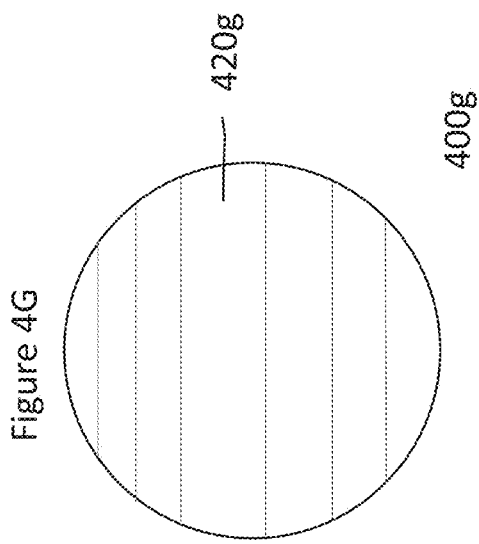

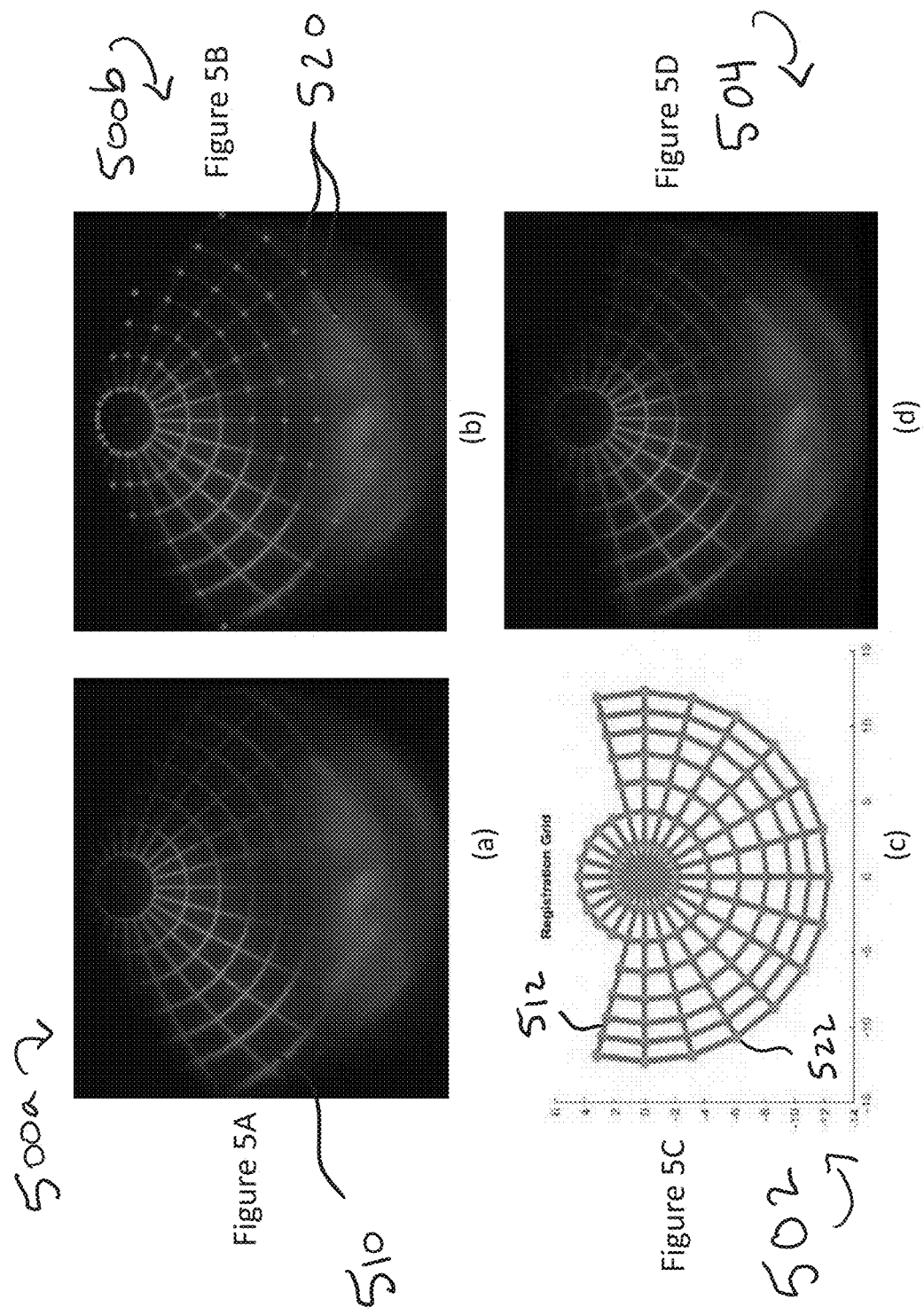

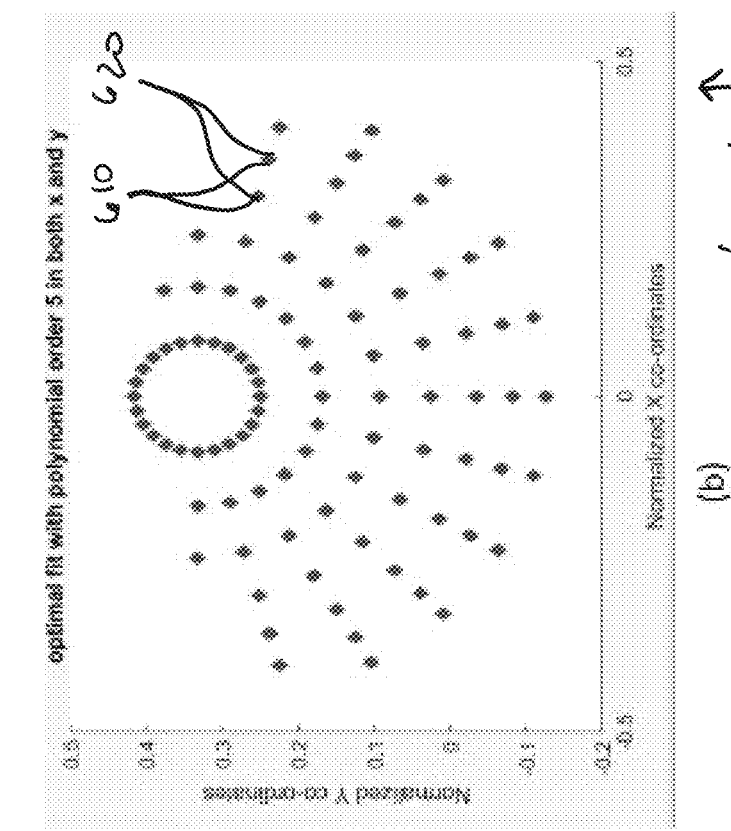
(b)
Figure 6B (600b)
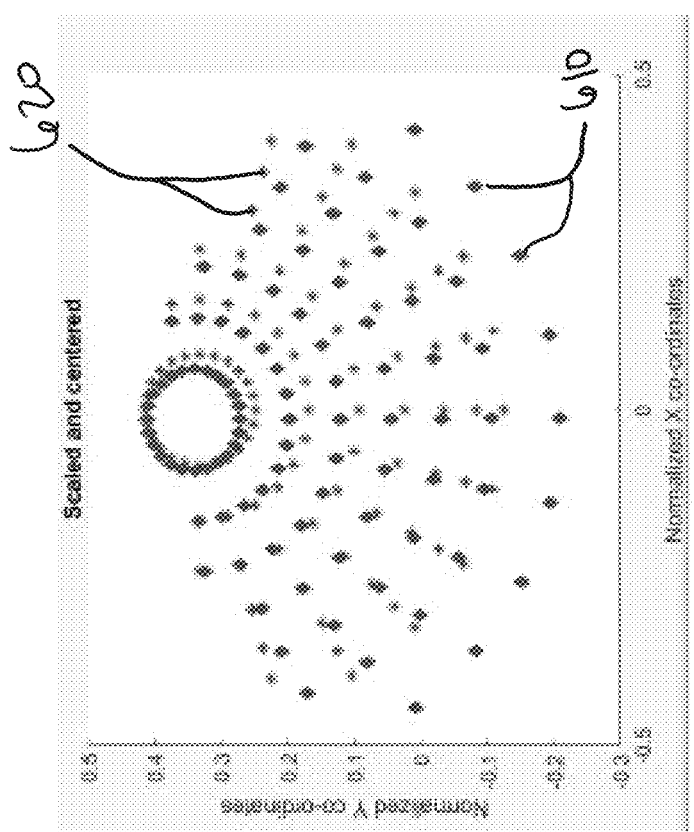
(a)
Figure 6A (600a)

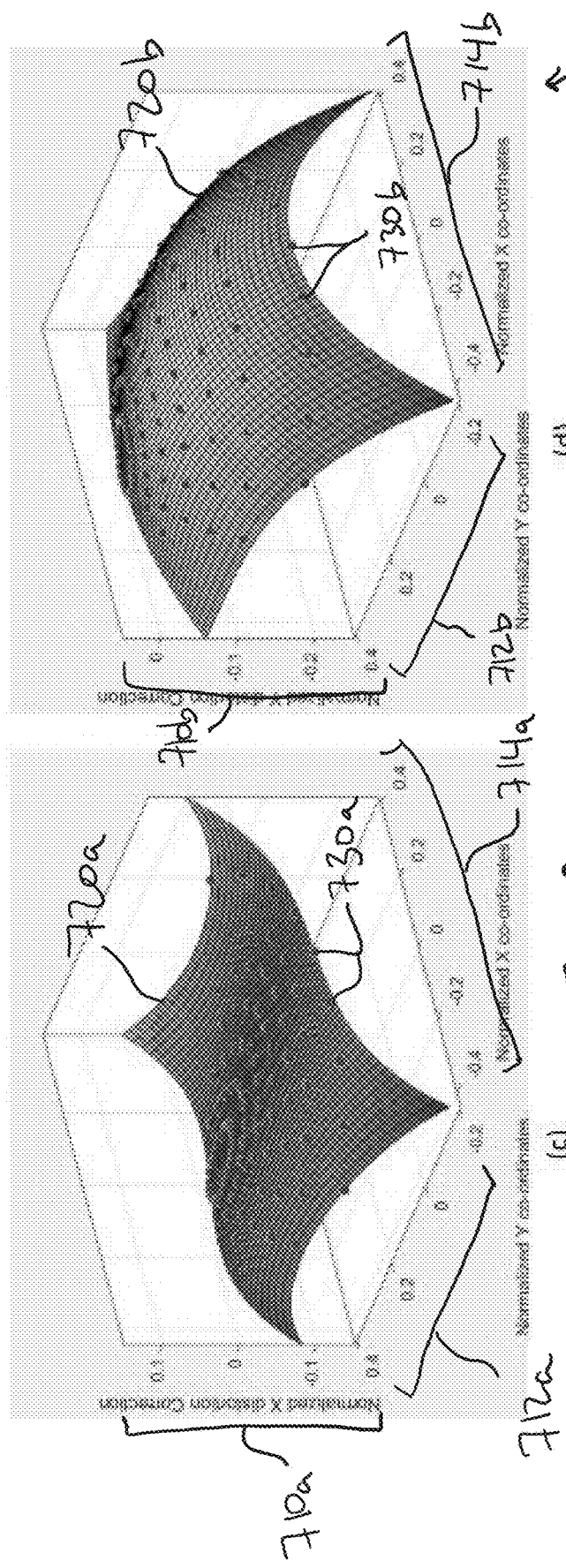

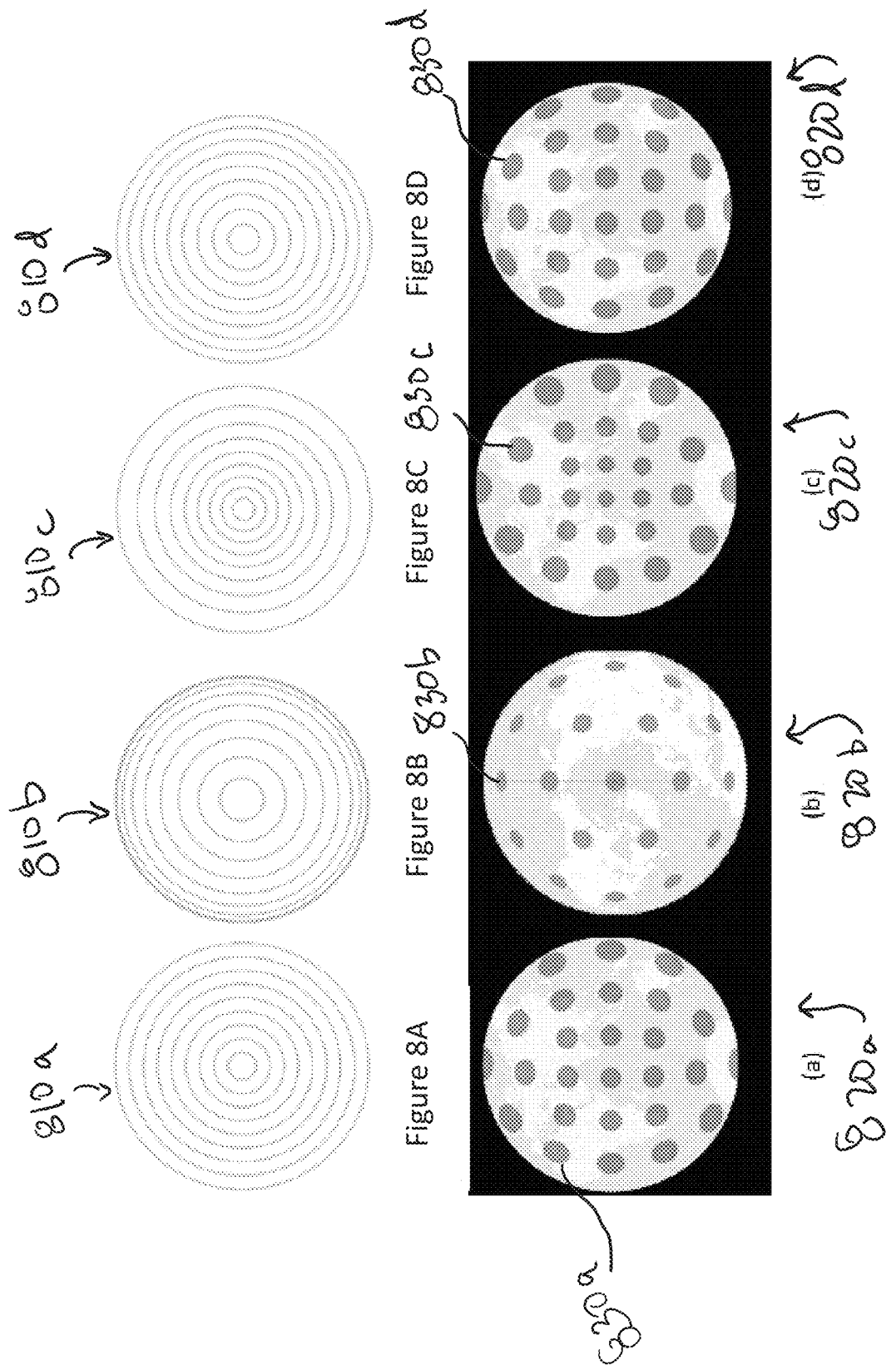

900a

900b

900c

900d

1100a

1100b

1100c

1100d

IMAGE CORRECTION FOR OPHTHALMIC IMAGES

FIELD

The application relates generally to methods for image correction for wide field of view images.

BACKGROUND

Ocular imaging is commonly used both to screen for diseases and to document findings discovered during clinical examination of the eye. Specifically, documentation and analysis of the posterior segment of the eye (e.g., retinal imaging) may be relevant to comprehensive eye examinations and full evaluations of current conditions, treatment, and/or early prevention of various eye conditions and diseases.

To achieve wider field of view (FOV) images, some approaches utilize a laser-scanning image illumination approach. However, such images are not true to color and require a very large device. Furthermore, as the FOV increases the distortions (optical and perspective/projective) degrade the quality and usefulness of the wide FOV images. The presence of these distortions also makes it very difficult to montage individual retina images properly and seamlessly. Another disadvantage of these defects is that the wide FOV images suffer from scaling differences and makes it difficult to quantify diseased areas in the full wide FOV image.

The subject matter claimed herein is not limited to embodiments that solve any disadvantages or that operate only in environments such as those described above. Rather, this background is only provided to illustrate one example technology area where some embodiments described herein may be practiced.

SUMMARY

Embodiments of the disclosure may include a method of generating a correction algorithm. The method may include obtaining a model of an eye, the model of the eye including a front portion that includes optics to mimic a cornea and a lens of a human eye, and a rear portion that includes a generally hemispherical-shaped body to mimic a retina of the human eye, where the rear portion including physical reference lines on an inside surface of the generally hemispherical-shaped body. The method may also include capturing images of the model of the eye using at least one image capturing device aimed at the model of the eye in which the at least one image capturing device is to be used when imaging an actual eye. The method may additionally include identifying vertices of the physical reference lines according to a given projection technique for displaying generally hemispherical-shaped body in a two-dimensional image in the captured images, and obtaining an idealized placement of the vertices of the physical reference lines according to the given projection technique. The method may additionally include performing bilinear interpolation to determine a first surface for correcting any pixel in the image according to a first difference between the identified vertices in the captured images and the idealized placement in an x-axis, and a second surface for correcting any pixel in the image according to a second difference between the identified vertices in the captured images and the idealized placement in a y-axis. The method may also include storing the first surface and the second surface as part of the correction algorithm such that any pixel of an image captured according to how the image capturing device is to be used when imaging the actual eye is corrected using the first surface to adjust a given pixel in the x-axis and the second surface to adjust the given pixel in the y-axis.

In some embodiments, the operation of bilinear interpolation may be simplified to linear interpolation if the image is broken into linear portions. For example, a polar coordinate system may be used such that radial coordinates (e.g., (r, q)) are used with the linear interpolation for a small region where the distortions change as a function of r but do not change as a function of q. A similar approach may be used in cartesian coordinate systems where a region may be selected where distortions only change in an x or y direction, and linear interpolation techniques may be used in such small regions. Additionally or alternatively, linear interpolation may be used for any other coordinate systems, such as cylindrical coordinates.

One or more embodiments of the present disclosure may further include operations such as capturing human-eye images of the actual eye using at least one of a second set of image capturing devices, applying the correction algorithm to the human-eye images, and stitching together the corrected human-eye images to achieve a wide field of view image of the actual eye, where the wide field of view image depicts a retina of the actual eye according to the projection technique.

BRIEF DESCRIPTION OF FIGURES

Example embodiments will be described and explained with additional specificity and detail through the use of the accompanying drawings in which:

FIGS. 3A-3D illustrate an example of a rear portion of a model eye;

FIGS. 4A-4H illustrate various examples of patterns associated with reference lines of a rear portion of a model eye;

FIG. 5A-5B illustrate an example of an image of a rear portion of a model eye;

FIG. 5C illustrates an ideal representation of the rear portion of the model eye of FIGS. 5A-5B;

FIG. 5D illustrates a corrected version of the image of the rear portion of the model eye of FIG. 5A;

FIGS. 6A-6C illustrate an example of point correction;

FIGS. 7A-7C illustrate examples of correction surfaces;

FIGS. 8A-8D illustrate various examples of projection techniques;

DESCRIPTION OF EMBODIMENTS

Figure 1:
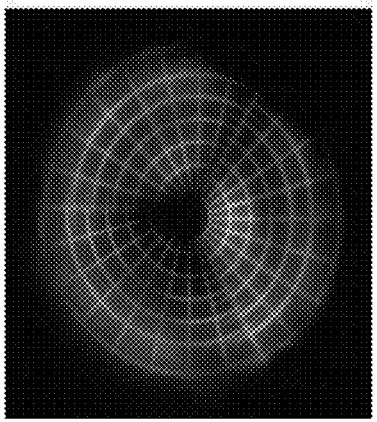
FIGS. 1A-1E illustrate examples of images taken of a model eye, and combining the images.

The present disclosure relates to, inter alia, correction techniques and approaches to resolve the problems associated with combining multiple images to achieve a wide FOV image of an eye. As used herein, the term wide FOV may refer to a widefield image, an ultra-widefield image, etc. for any increased field of view image.

To address one or more problems associated with generating a wide FOV image of the eye, in some embodiments, a model eye may be constructed with reference markings within the model eye. A camera or other image capturing device or system that is to be used to capture multiple images to be combined into a wide FOV image may be arranged in the manner in which they are to be used to capture images of an actual eye. The camera or other image capturing device or system may then be used to capture multiple images of the model eye in the same or comparable manner in which they will be used in normal operation. Each individual image of the model of the eye may be used to create a correction surface by determining the difference in location of the reference markings of the model eye in the captured images with an ideal representation of the reference markings of the model eye. For example, a first correction surface may be generated that represents the change in x direction for any pixel in an image, and a second correction surface may be generated that represents the change in y direction for any pixel in the image. that may be used to generate a generic correction algorithm that may be applied to any images taken during use when capturing images of a human eye. The correction surfaces, and/or representations thereof may be stored as a correction algorithm to be applied to images captured by the camera or other image capturing device or system when used in normal operation. In some embodiments, each correction algorithm may be associated with a particular camera in a camera system or a particular orientation of a camera such that each individual image that may be a part of the combined wide FOV image may have its own corresponding correction algorithm.

In some embodiments, the correction algorithm may be tuned for a particular projection technique (e.g., the manner in which the three-dimensional hemispherical shape of the eye is projected into a two-dimensional image). For example, the ideal representation used to generate the correction algorithm may be an ideal representation of the reference markings of the model eye according to a desired projection technique (e.g., an orthographic projection, equidistant projection, equal area solid azimuthal projection, etc.). In these and other embodiments, a correction algorithm for each potential projection may be developed.

When used in normal operation, the camera or other image capturing device or system may capture the multiple images (e.g., by a device that captures the multiple images at once or in quick succession, by moving the device between capturing each of the multiple images, and/or by having the patient move their eye between capturing each of the multiple images). Each of the multiple images may apply the corresponding correction algorithm for the desired projection. After correction/projection, the individual images may be combined into the wide FOV image. Such combination may be performed by stitching and/or stamping the images together. Additionally or alternatively, landmarks/features may be identified and/or merged in combining the images. Additionally or alternatively, affine transformation maybe performed on one or more of the images in the combination to generate the wide FOV image.

In these and other embodiments, the development of the correction algorithm may act as a calibration of the camera or other image capturing device or system when being manufactured. Additionally or alternatively, such calibration may be performed periodically on a device in clinical use and/or before each use in a clinical setting.

For some embodiments of the present disclosure, processing-expensive modeling and/or prediction of distortions may be avoided. Additionally or alternatively, cameras may not be required to be calibrated for intrinsic and/or extrinsic properties. Additionally or alternatively, image combination may be performed using affine transformations rather than more processing-expensive combination techniques.

FIGS. 1A-1E illustrate examples of images taken of a model eye, and combining the images, in accordance with one or more embodiments of the present disclosure. The images 100a, 100b, and 100c of FIGS. 1A-1C, respectively, represent individual images captured of the model eye. The images 100d and 100e of FIGS. 1D and 1E, respectively, are examples of combining all three images 100a-100c into a single image. As can be seen in the images 100d and 100e, by combining the images, a wide FOV image may be obtained. However, as can be seen by comparing FIGS. 1D and 1E, certain aberrations, distortions, errors, and/or artifacts may occur in the combined image, particularly in regions near the boundaries between the source images 100a-100c.

In some embodiments, the images 100a-100c may contain optics-based aberrations, particularly as the FOV increases. Furthermore, as the FOV increases, optics are more expensive to counteract the aberrations near the boundaries of the FOV. Additionally, such aberrations may decrease resolution and clarity of the images, particularly at the periphery of the images 100a-100c. Such optics-based aberrations may include barrel, pin cushion, moustache, S-shaped, radial-distortions, etc. In these and other embodiments, to correct such aberrations, each image may undergo extensive processing to counteract these aberrations. For example, the error may be mathematically quantified and the inverse or negative relationship to the error may be applied to the pixels of the image to resolve the aberrations.

In some embodiments, the images 100a-100c may additionally or alternatively include perspective-based distortions that may be due to an angle of the camera or other image-capturing device. For example, the images 100a-100c may be captured from cameras that are off-axis from a central axis such that each image may be skewed, have a keystone effect, etc. or from a single camera that has been moved between capturing images. As another example, such images may be captured from a single image capturing device at different points in time after a patient has moved their eye (e.g., to look at a focal point at different locations). Such perspective-based distortions may be resolved using techniques such as 2-D homography, 3D to 2D camera projections, fundamental matrix computation, trifocal tensor computation, etc.

In some circumstances, to resolve the artifacts when combining the images, computationally expensive processes may be utilized. For example, to perform the processing to correct the errors in each individual image, and then perform the image processing to combine the images may require large amounts of computing power. Additionally, attempting to package such computing power in a portable device may be very expensive or difficult, causing the use of a large and bulky machine in a medical office that desires to capture and combine images in a useful manner.

Figure 2:
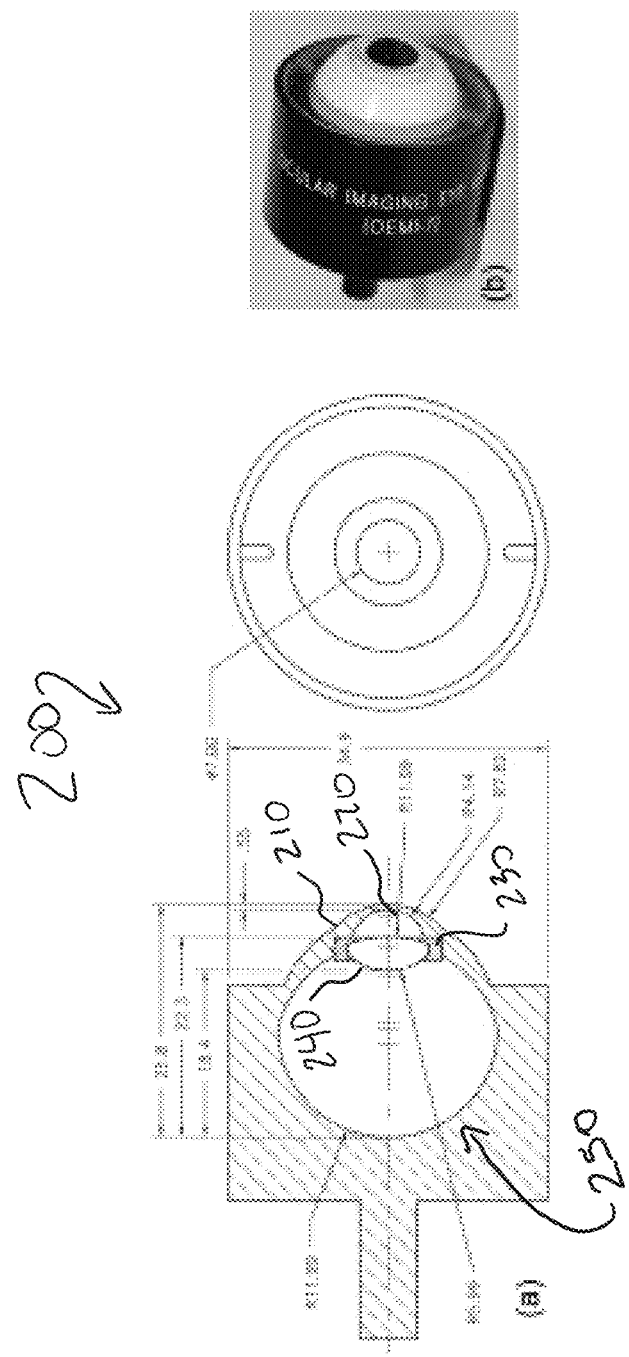
FIG. 2 illustrates an example of a model eye.

FIG. 2 illustrates an example of a model eye 200, in accordance with one or more embodiments of the present disclosure. The model eye 200 may include a front portion with one or more components to mimic a sclera 210, a cornea 220, an iris 230, and/or a lens 240. The model eye 200 may additionally include a rearward portion 250 shaped to mimic the generally hemispherical shape of a retina of a human eye. In some embodiments, the model of the eye 200 may be shaped and/or sized to represent the dimensions and/or properties of an average human eye. The model eye 200 may be used to facilitate generation of a correction algorithm to facilitate error-correction in images of the human eye.

FIGS. 3A-3D illustrate an example of a rear portion 300 of a model eye, in accordance with one or more embodiments of the present disclosure. The rear portion 300 may replace that of a generic model eye, such as that illustrated in FIG. 2. For example, the rear portion of the model eye 200 may be removed and the rear portion 300 may be attached in its place.

As illustrated in FIGS. 3A-3D, the rear portion 300 may include reference markings within the generally hemispherical shape of the rear portion 300. In some embodiments, the reference markings may include radial lines 310 radiating outward from a center of the rear portion 300. Additionally or alternatively, the rear portion 300 may include circumferential lines 320 that may concentrically extend outwards from the center of the rear portion.

In some embodiments, the reference markings (e.g., the radial lines 310 and the circumferential lines 320) may be etched, carved, engraved, or otherwise physically input into the inside surface of the rear portion 300. In some embodiments, the reference markings may be painted, drawn, or otherwise attached to the inside surface of the rear portion 300.

In some embodiments, the rear portion 300 may be sized to correspond to an average human retina radius of curvature (e.g., a radius of 12.7 mm). Additionally or alternatively, the rear portion 300 may include circles of constant radius at regular interval, e.g., every 10-degrees latitude from 10 degrees to 90 degrees (e.g., the circumferential lines 320). Additionally or alternatively, the rear portion may include radial lines at constant azimuth, e.g., every 15 degree (e.g., the radial lines 310). These numbers are merely examples used in illustrating concepts of the present disclosure and may be increased or decreased. The radial lines 310 and/or the circumferential lines 320 may be used for calibrating the image-capturing devices to correct for aberrations and distortions.

Modifications, additions, or omissions may be made to the rear portion 300 without departing from the scope of the present disclosure. For example, the rear portion 300 may include more or fewer elements than those illustrated in FIG. 3. For example, the rear portion 300 may include any type of reference markings.

FIGS. 4A-4H illustrate various examples of patterns associated with reference markings 410 of a rear portion 400 of a model eye, in accordance with one or more embodiments of the present disclosure.

Figure 4A:
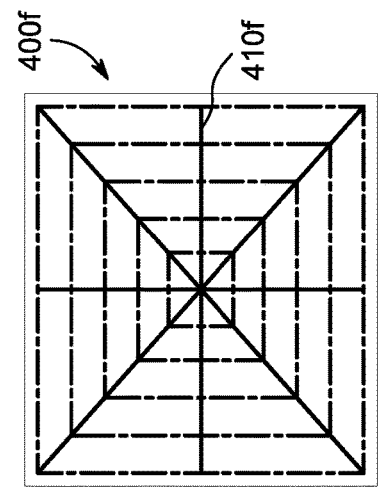

FIG. 4A illustrates an example of a rear portion 400*a* with radiating lines radiating outward form the center of the rear portion 400*a* as the reference markings 410*a*. Additionally, FIG. 4A illustrates radial sectors 415 (e.g., the radial sectors 415*a* and 415*b*) where the distortions may not change as a function of q within the radial sector 415. For example, as illustrated in FIG. 4A, polar coordinates with a radial coordinate r and azimuth angle q may be used rather than cartesian coordinates with x and y values. In some embodiments, by using the polar coordinates rather than cartesian coordinates, a linear interpolation approach may be used rather than a bilinear interpolation.

Figure 4B:
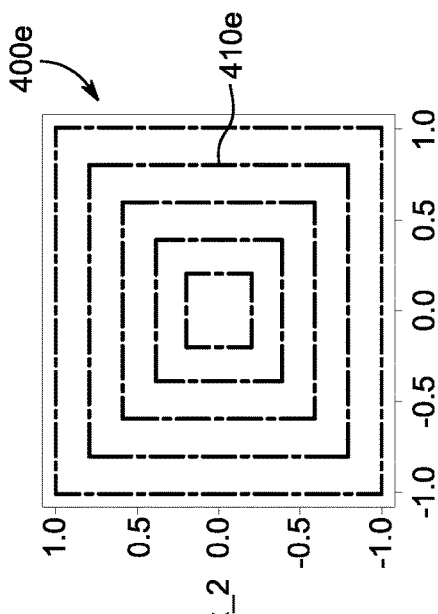

FIG. 4B illustrates an example of a rear portion 400*b* with a checkerboard pattern upon the rear portion 400*b* as the reference markings 410*b*.

Figure 4C:
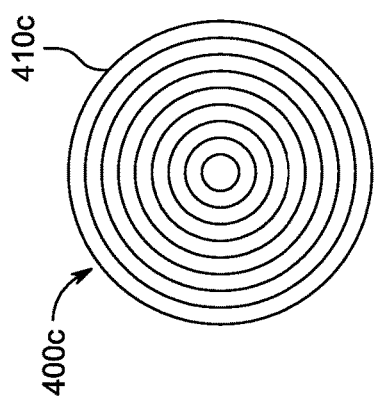

FIG. 4C illustrates an example of a rear portion 400*c* with concentric circumferential lines concentric with the center of the rear portion 400*c* as the reference markings 410*c*.

Figure 4D:
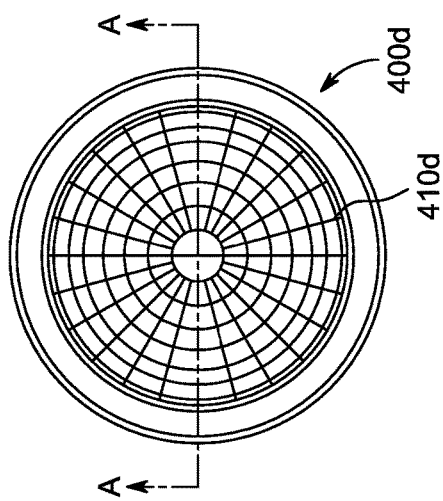

FIG. 4D illustrates an example of a rear portion 400*d* with radiating lines and concentric lines as the reference markings 410*d*.

Figure 4E:
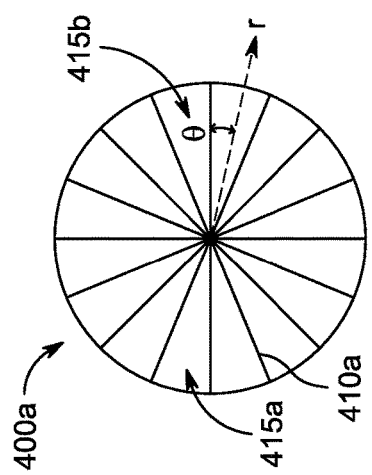

FIG. 4E illustrates an example of a rear portion 400*e* with nested squares/rectangles aligned about the center of the rear portion 400*e* as the reference markings 410*e*.

Figure 4F:
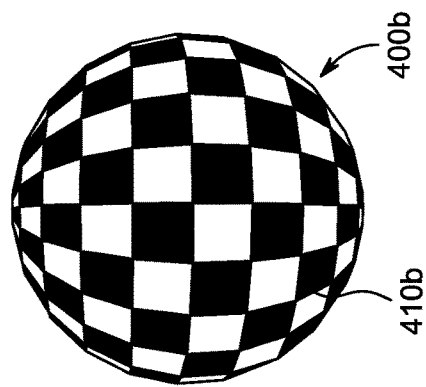

FIG. 4F illustrates an example of a rear portion 400*f* with nested squares/rectangles aligned about the center of the rear portion 400*f* in conjunction with radiating lines as the reference markings 410*f*.

FIG. 4G illustrates an example of rear portion 400*g* that may use reference markings 420*g* to divide the rear portion 400*g* into small strips 420 along the horizontal axis. In some embodiments, the strips created by the markings 420*g* may permit modeling the distortions in a one-dimensional fashion where within the distortion of the strip created by the markings 420*g* may depend upon one variable only (such as r in a polar coordinate system).

FIG. 4H illustrates an example of rear portion 400*h* that may use reference markings 420*h* to divide the rear portion 400*h* into smaller strips with an arbitrary angle from the horizontal axis. For example, the strips created by the markings 420*h* may allow for modeling the distortions in a one-dimensional fashion where within the strip created by the markings 420*h* may depend upon one variable only after coordinate transformations. For example, the coordinate It will be appreciated that the example rear portions 400 illustrated in FIGS. 4A-4H are merely examples, and any other pattern or style of reference markings 410 may be included upon the inside surface of the rear portion 400.

FIG. 5A-5B illustrate an example of an image 500 of a rear portion of a model eye, in accordance with one or more embodiments of the present disclosure. The image 500*a* includes the image as captured, and the image 500*b* includes markings of vertices 520 of reference markings 510. The image 500*a* represents one image that ultimately be combined with other images to generate a wide FOV image. While one perspective/one sub-image is illustrated in FIG. 5A and used as an example in FIGS. 6A-6C and 7A-7C, it will be appreciated that the same principles are applicable to other sub-images with other perspectives, and may be applied to any number of sub-images.

As can be seen in image 500*a* of FIG. 5A, the reference markings 510 may be distorted as compared to a completely accurate representation of the model of the eye. For example, the reference markings 510 at the periphery of the image are much wider than the reference markings 510 towards the middle of the image. As another example, the reference lines have a curve to them, rather than being straight.

To identify the error observed in the image 500, vertices 520 of the reference markings 510 may be used. The image 500*b* includes identification of the vertices 520 of the reference markings 510 of the model eye as they are captured in the image 500*a*. For example, automatic image processing, edge detection, or any other technique may be used to identify each of the vertices in the image 500. In some embodiments, identification of the vertices 520 may be performed manually by a user or operator of the eye model and image capturing device. The identification of the vertices 520 may permit the comparison of the location of the vertices in the image 500 to those of an ideal/actual representation of the model of the eye.

When capturing the image 500, the image capturing device may be positioned to be aligned in the manner in which it will be used in normal operation. If the image capturing device has a wide-enough field of view, a single image may be used for capturing the image 500 and may be aligned and/or positioned as it would be to capture the single image during use. For embodiments in which multiple images are combined for a wider FOV, the image capturing device(s) may be positioned and/or oriented in the same manner as they will be when used to capture images of an actual eye rather the model eye. For example, if the image capturing device includes off-axis imaging channels around a central axis aligned with the center of the eye to be imaged, the image capturing device may be so aligned when capturing the image 500. As another example, if a single image capturing devices is used and moved between each successive image to capture a wider field of view, the device may be moved as it would be during normal operation to capture images of the model of the eye as the model of the eye remains stationary. As an additional example, if a single image capturing device is used and the eye is moved (e.g., the patient is asked to focus on different points for each image captured), the image capturing device may be fixed and the model of the eye may be moved between each image.

In these and other embodiments, the images 500 may be acquired even for circumstances in which distinct images are captured in a series of actions (e.g., the patient repositions their eye or the camera is repositioned between successive image captures).

While the image 500 may represent one potential perspective and region of the rear portion as being imaged, any number of images may be captured, covering any region of the rear portion.

FIG. 5C illustrates an ideal representation 502 of the rear portion of the model eye of FIGS. 5A-5B, including the reference markings 512. The ideal representation 502 may include one marking for the reference markings 512 and another marking for the vertices 522.

FIG. 5D illustrates a corrected version 504 of the image 500*a* of the rear portion of the model eye of FIG. 5A, in accordance with one or more embodiments of the present disclosure. The correction may be described in greater detail herein, for example, with reference to FIGS. 6A-6C and 7A-7C.

Figure 6C:
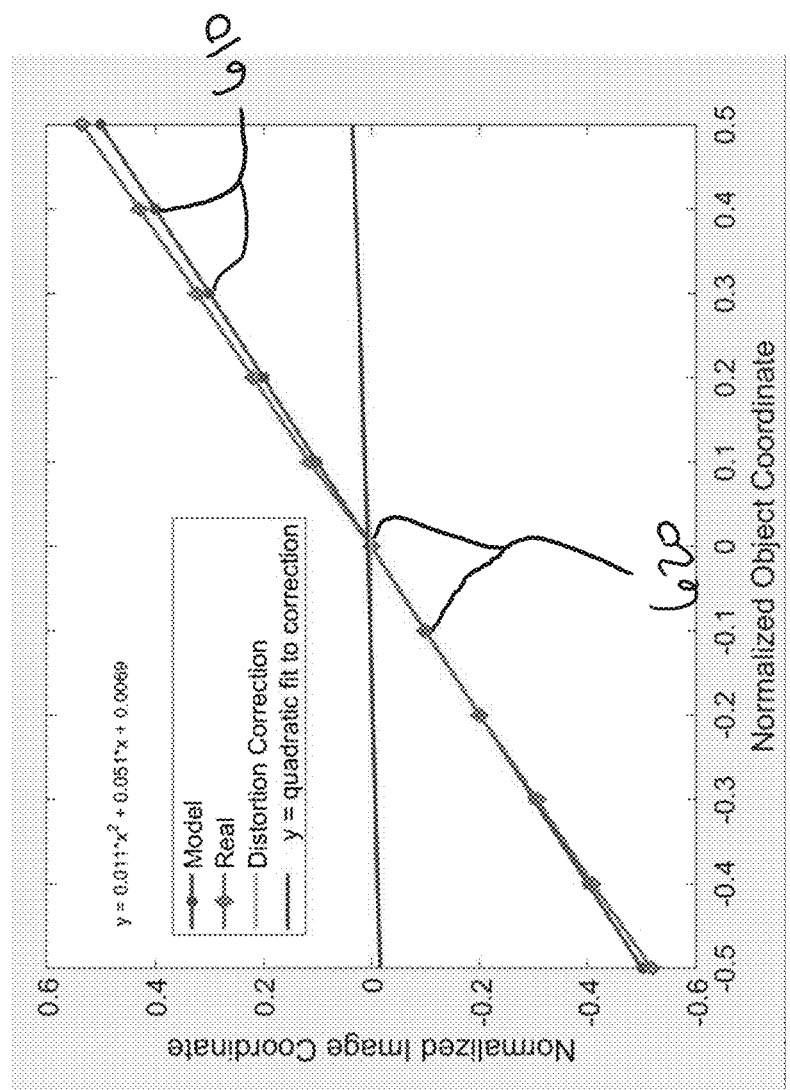

FIGS. 6A-6C illustrate an example of point correction, in accordance with one or more embodiments of the present disclosure. For example, FIG. 6A may depict a plot 600*a* of the points 610 corresponding to the vertices of the ideal representation (such as the vertices 522 of FIG. 5C) and the points 620 corresponding to the vertices of the actual captured image (such as the vertices 520 of the image 500*b* of FIG. 5*b*). FIG. 6B may depict a plot 600*b* of the points 610 corresponding to the vertices of the ideal representation corresponding to the points 620 after determining a mapping of the points 620 from their position in FIG. 6A to their position in FIG. 6B. FIG. 6C may depict a plot 600*c* of the points 610 corresponding to an ideal representation and the points 620 of the actual captured image after being converted to a coordinate system and applied to a small enough region where distortions occur according to a single variable such that linear interpolation may be used.

For example, as illustrated in FIGS. 6A and 6B, for each of the points 620, there may be some variation in x and y directions that may shift the points 620 to match the corresponding point 610. Such shifting may vary by point and may or may not be consistent across the points 620. For example, a point near the center of the image may have less distortion and so may have a smaller transition in the x and/or y direction than those closer to the periphery of the image. In some embodiments, processing may be performed on the difference between the points such that the differences between the points 610 and 620 may be found across the entire area of the image.

In some embodiments, when comparing the points 610 and/or 620, the sets of points 610 and/or 620 may be scaled, centered, and/or normalized. In some embodiments, when comparing points 610 and/or 620, the sets of points 610 and/or 620 may be transformed from cartesian coordinate system to another system, e.g., polar, or cylindrical coordinate system. Additionally or alternatively, when comparing the points 610 and/or 620, the sets of points 610 and/or 620 may be transformed, separated, reduced, sub-divided, etc. into smaller regions where the error between the points 610 and 620 may be able to be represented as a function of one variable. FIG. 6C illustrates such an embodiment, including the fitting of a polynomial to the error correction. The polynomial may be used as an error-correction algorithm.

Figure 7C:
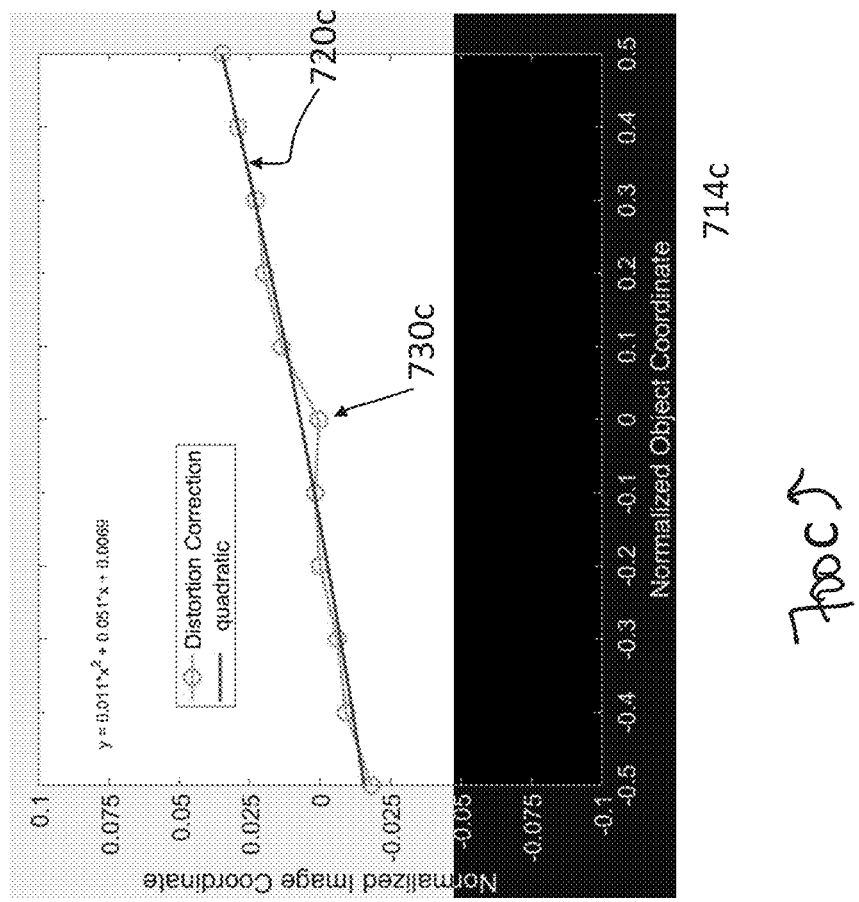

FIGS. 7A-7C illustrate examples of correction surfaces, in accordance with one or more embodiment s of the present disclosure.

FIG. 7A illustrates a plot 700*a* of a correction surface 720*a* along x and y coordinates (axes 714 and 712, respectively). The correction surface 720*a* varies vertically along the axis 710*a* representing the amount of distortion correction along the x-axis for the given point at the x and y coordinates of the axes 714 and 712. For example, for a given point of the points 730*a*, at the given point on the correction surface, the amount of x-axis variation between the captured image and the actual model of the eye is represented by the vertical variation in the correction surface 720*a*. Stated another way, if there were no errors in the captured image (e.g., no distortions due to perception and/or no aberrations due to optics), the correction surface 720*a* would be completely flat.

By using the correction surface 720*a*, any pixel in an image may have a known correction factor in the x direction based on the correction surface 720*a*. Stated another way, for an image that corresponds to the region represented by the correction surface 720*a*, the pixels in the image may be shifted in the x direction based on mapping the pixels to the surface to perform correction.

FIG. 7B illustrates a plot 700*b* that is similar or comparable to the plot 700*a* of FIG. 7A. The plot 700*b* includes a correction surface 720*b* that includes the same x and y coordinates along the axes 714 and 712 respectively. The correction surface 720*b* may include the amount of distortion correction along the y-axis along the vertical axis 710*b*. In a similar manner to that described with reference to the correction surface 720*a*, the correction surface 720*b* may be used to provide pixels with the amount of correction in the y direction to be applied to the pixels of a captured image.

By using the correction surfaces 720*a* and 720*b*, for a given captured image from a known capture position/orientation, a simple correction algorithm may be applied to the pixels of the image to shift them in the x and/or y direction to overcome distortions and/or aberrations in the image. For example, because the model eye used to create the surfaces is an average size the correction surfaces 720*a* and 720*b* may be a reasonable representation of patients. Additionally, because the orientation, alignment, etc. from which the image is captured to create the correction surfaces 720*a* and 720*b* is the same or similar to what will be used when capturing images of patients during normal operation of the image capturing device, the correction may be predictable and repeatable.

FIG. 7C illustrates a plot 700c that is a one dimensional variation of the plot 700a of FIG. 7A. For example, the plot 700c includes a correction curve 720c that includes a single dimensional object coordinate. The correction curve 720c may include the amount of distortion correction along the single dimensional coordinate. In a similar manner to that described with reference to the correction surface 720a, the correction curve 720c may be used to provide pixels with the amount of correction in the single dimensional coordinate to be applied to the pixels of a captured image.

The plot 700c of FIG. 7C may include a one-dimensional representation of the distortion correction where an image is divided into sub-images or other such smaller regions such that the distortion correction is a function of a single variable. To form a complete image, the same process as shown in FIG. 7C may be repeated over each of the sub-images until a complete image is processed. In some embodiments, the sub-images may overlap with one another and the correction for a pixel in the overlap region may be a combination, such as an average, between the overlapping corrections.

Modifications, additions, or omissions may be made to the plots 700a/700b/700c without departing from the scope of the present disclosure. For example, any technique may be used to store the information associated with the correction surfaces 720a/720b and/or the correction curve of 730c.

FIGS. 8A-8D illustrate various examples of projection techniques, in accordance with one or more embodiments of the present disclosure. For example, in some embodiments, the correction surfaces 720a/720b and/or the correction curve 730c of FIGS. 7A-7C may be based on a particular projection technique such that after having applied the correction surfaces 720a/720b and/or the correction curve 730c to a pixel of a collected image, and/or to a pixel of a sub-image of a set of sub-images that make a complete collected image, the pixel may be oriented in the particular projection technique. Each of FIGS. 8A-8D illustrate a different projection technique, with a top image 810 of equally spaced apart circumferential lines about a sphere, and a bottom image 820 illustrating the effect of the projection technique on a globe of the Earth with Tissot's indicatrices 830 to facilitate a visualization of any spatial artifacts caused by the various projection techniques.

FIG. 8A corresponds to an equidistant projection technique. The upper plot 810a shows that the circumferential lines are at an equal distance from each other. To accomplish the equidistant projection technique, as can be observed in the lower plot 820a, the Tissot's indicatrices 830a become skewed and enlarged as they extend closer to the periphery of the projection.

FIG. 8B corresponds to an orthographic projection technique. The upper plot 810b shows that the circumferential lines start further away (e.g., more "zoomed in") at the middle of the projection and are closer together (e.g., more "zoomed out") at the periphery of the projection. To accomplish the orthographic projection technique, as can be observed in the lower plot 820b, the Tissot's indicatrices 830b become flattened about the center point as they approach the periphery.

FIG. 8C corresponds to a stereographic projection technique. The upper plot 810c shows that the circumferential lines start closer together (e.g., more "zoomed out") at the middle of the projection and are closer together (e.g., more "zoomed in") at the periphery of the projection. To accomplish the stereographic projection technique, as can be observed in the lower plot 820c, the Tissot's indicatrices 830c become enlarged without being skewed as they approach the periphery.

FIG. 8D corresponds to an equal area solid angle azimuthal projection technique, which is similar to the equidistant projection technique with slight variation. Rather than being equal throughout the entire projection as illustrated in FIG. 8A, the upper plot 810d shows that the circumferential lines are slightly closer together (e.g., more "zoomed out") at the periphery of the projection. To accomplish the equal area solid angle azimuthal projection technique, as can be observed in the lower plot 820d, the Tissot's indicatrices 830d become slightly more elongated as they approach the periphery.

FIGS. 9A-9D illustrate examples of ideal representations 900 of the rear portion of a model eye according to various examples of projection techniques, in accordance with one or more embodiments of the present disclosure.

Figure 9A:
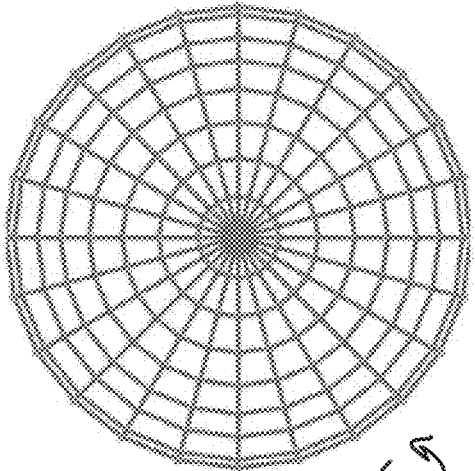
FIGS. 9A-9D illustrate examples of an ideal representation of the rear portion of a model eye according to various examples of projection techniques.

As illustrated in FIG. 9A, the representation 900a represents the reference lines and associated vertices of the rear portion 300 illustrated in FIGS. 3A-3D according to the equidistant projection technique as illustrated in FIG. 8A.

Figure 9B:
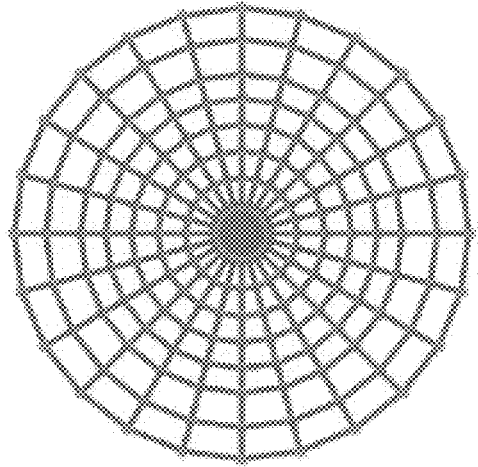

As illustrated in FIG. 9B, the representation 900b represents the reference lines and associated vertices of the rear portion 300 illustrated in FIGS. 3A-3D according to the orthographic projection technique as illustrated in FIG. 8B.

Figure 9C:
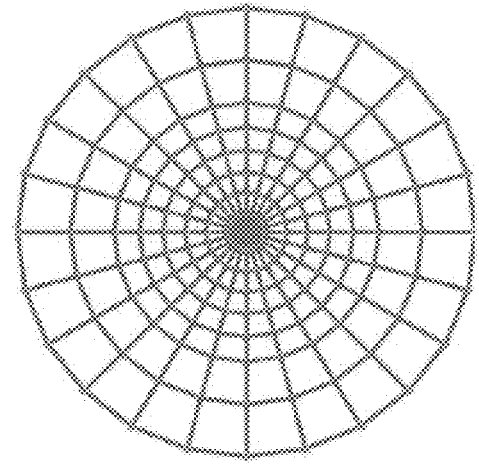

As illustrated in FIG. 9C, the representation 900c represents the reference lines and associated vertices of the rear portion 300 illustrated in FIGS. 3A-3D according to the stereographic projection technique as illustrated in FIG. 8C.

Figure 9D:
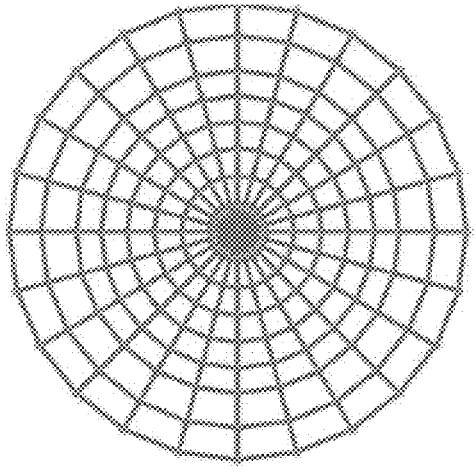

As illustrated in FIG. 9D, the representation 900d represents the reference lines and associated vertices of the rear portion 300 illustrated in FIGS. 3A-3D according to the equal area solid angle azimuthal projection technique as illustrated in FIG. 8D.

While FIGS. 8A-8D and FIGS. 9A-9D illustrate some examples of projection techniques, it will be appreciated that any number, style, or type of projection techniques may be used to represent the hemispherical shape of an eye being imaged in two dimensions.

In some embodiments, the ideal representations 900a-900d may be used in the same or similar manner as described with respect to the ideal representation 502 of FIG. 5C. For example, the edges and vertices of the reference lines may be mapped and annotated according to the projection technique in the ideal representations 900a-900d, and used in conjunction with images such as those in FIG. 5A to identify and generate correction surfaces similar or comparable to that described in FIGS. 6A-6B and 7A-7B. Additionally or alternatively, the processing of a series of correction curves such as those illustrated and described with reference to FIGS. 6C and 7C may provide similar results using a one-dimensional linear interpolation. For example, the correction surfaces for the equidistant projection associated with FIG. 9A may be used to take an image (or images) and convert them directly into the equidistant projection while also solving for visual distortions, etc. The other correction surfaces as determined using the ideal representations 900b-900d may also be used to convert images directly to the orthographic projection, stereographic projection, and/or equal area solid angle azimuthal projection, respectively. In some embodiments, the correction surfaces may be stored as a set of coefficients to a polynomial or some other mathematical form and/or computer-readable code as a correction algorithm. In these and other embodiments, for an image captured during normal operation, the correction algorithm may be applied to the pixels in the captured image to correct and project the pixels to their proper location in the desired projection.

Figures 10A, 10B, 10C, 10D:
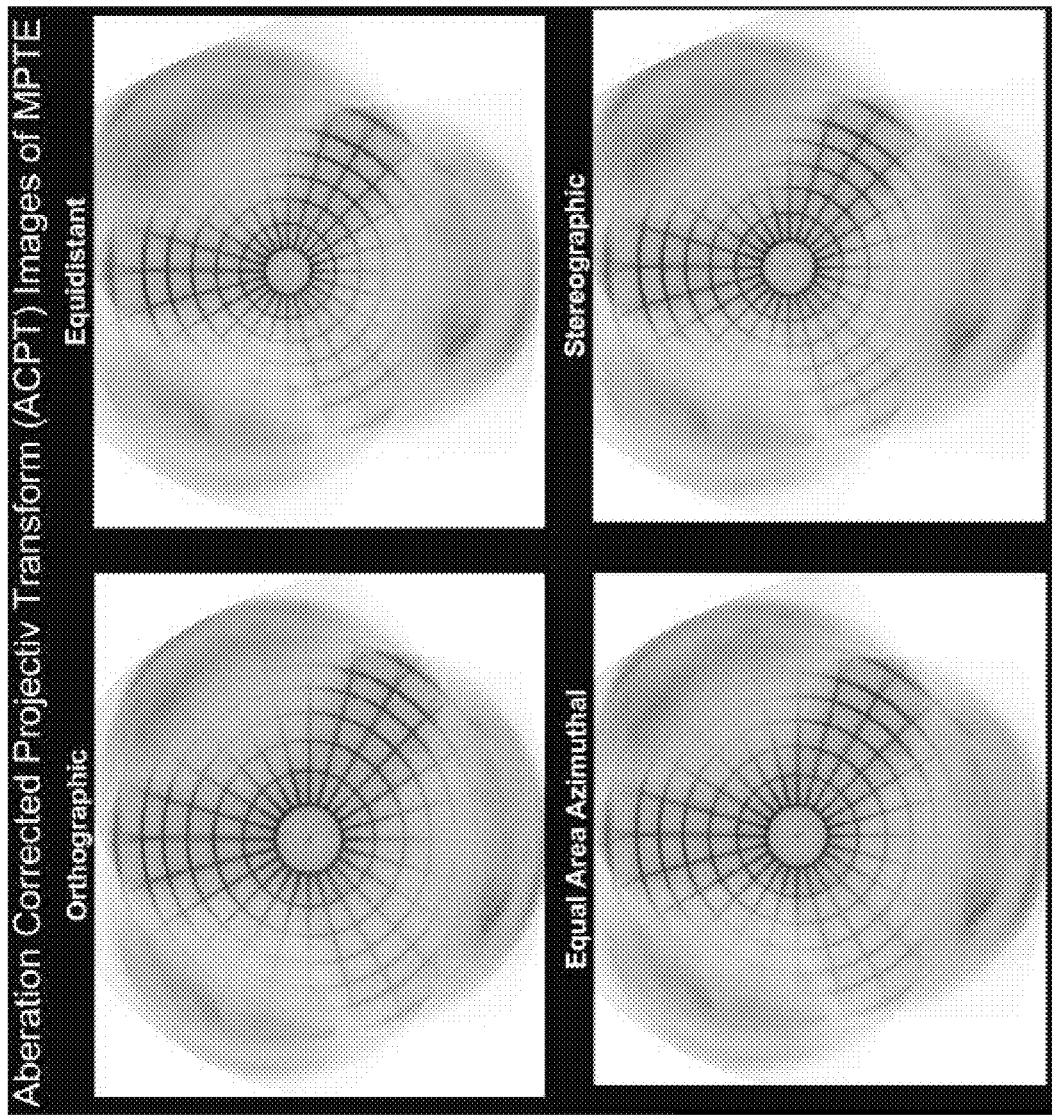
FIGS. 10A-10D illustrate various examples of corrected and projected and combined images of a model of an eye.

FIGS. 10A-10D illustrate various examples of corrected and projected and combined images 1000a-1000d of a model of an eye, in accordance with one or more embodiments of the present disclosure. For example, the images 1000a-1000d may be generated based on correction surfaces generated based on the ideal representations 900a-900d illustrated in FIGS. 9A-9D, respectively. FIG. 10A illustrates the orthographic projection of the model of the eye, FIG. 10B illustrates the equidistant projection of the model of the eye, FIG. 10C illustrates the equal area solid azimuthal projection of the model of the eye, and FIG. 10D illustrates the stereographic projection of the model of the eye.

In some embodiments, the images 1000a may be generated by combining multiple images of different regions of the model of the eye. Because the different images are corrected and placed into a particular matching projection, the combination of the distinct images of the different regions of the model of the eye may be performed in a straightforward manner with low processing power. For example, the combination of images may be stamped together (e.g., superimposed one upon the other) or stitched together (e.g., applying some sort of blending or other image processing to combine the combination of images). Additionally, if there are small variations (for example, due to small eye motion during image capture or between image captures), the correction technique to address these small variations when combining the images may follow an affine transformation process (e.g., a linear mapping method that preserves points, straight lines, and planes). In some embodiments, the images 1000a may be generated by registering and/or combining individual sub-images based on features or landmarks within the individual sub-images. In some embodiments, a combination of affine transformation and/or feature or landmark identification may be used to combine the sub-images.

FIGS. 11A-11D illustrate various examples of corrected, projected, and combined images 1100a-1100d of an actual eye, in accordance with one or more embodiments of the present disclosure. As illustrated in each of the images 1100a-1100d, the correction techniques depicted in the images 1000a-1000d with the model eye are also applicable to the actual eye. As can be seen in the images 1100a-1100d, the individual images may be combined in a seamless manner to generate a wide FOV of the retina of the eye, while also placing the image in a desired projection.

Figure 11A:
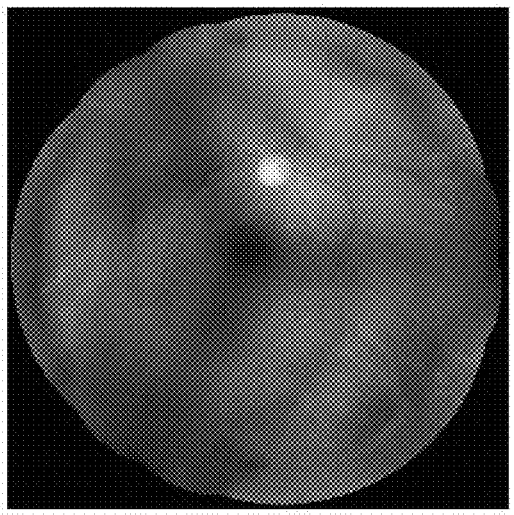
FIGS. 11A-11D illustrate various examples of corrected and projected and combined images of an actual eye.
Figure 11B:
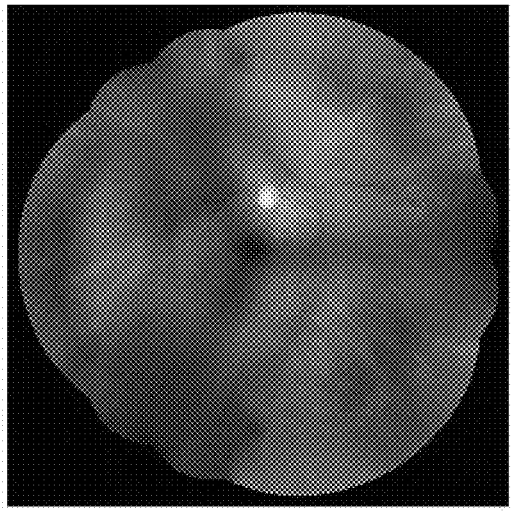
Figure 11C:
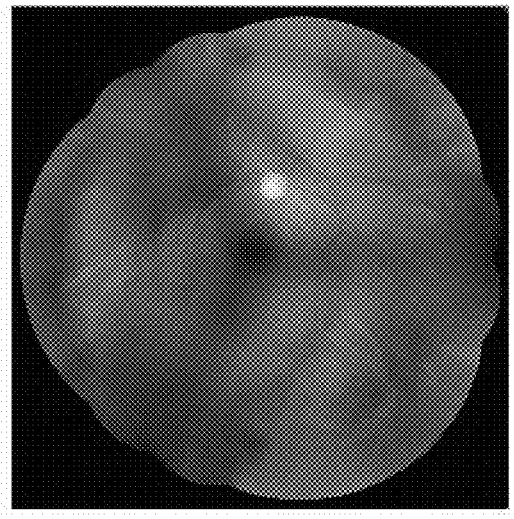
Figure 11D:
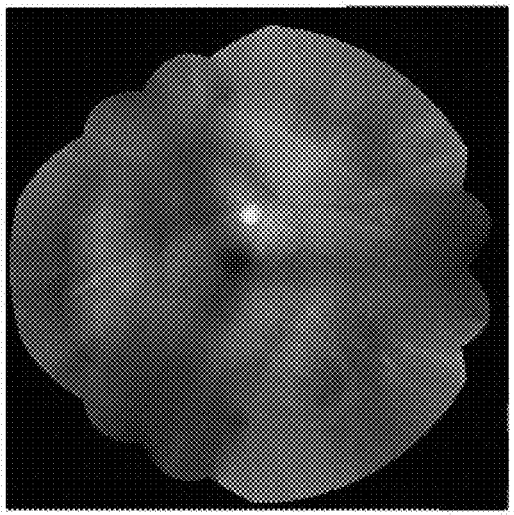

In some embodiments, a user may desire to observe a wide FOV image of the eye in a first projection, such as the orthographic projection illustrated in FIG. 11A. The user may next desire to observe the same wide FOV image in a different projection, such as the equidistant projection illustrated in FIG. 11B. In some embodiments, the original captured images used to generate the initial wide FOV image may be stored such that the correction algorithm for the different projection technique may be applied to the original images, and the corrected/projected sub-images may be combined in the wide FOV image in the different projection. Additionally or alternatively, the already-projected image may undergo image processing to transition between projection techniques. For example, the differences between the ideal representations illustrated in FIGS. 9A-9D represent the differences between the four example projection techniques and an appropriate pixel mapping may be performed to transition between the two projections. When transitioning between projections, using the original images and applying a distinct correction algorithm associated with the second projection technique may preserve a higher quality image, while using additional storage space as the original images are stored. When transitioning between projections, using the already-projected wide FOV image may have a slightly lower quality image (because of the successive processing), but the original images may or may not be stored.

Figure 12:
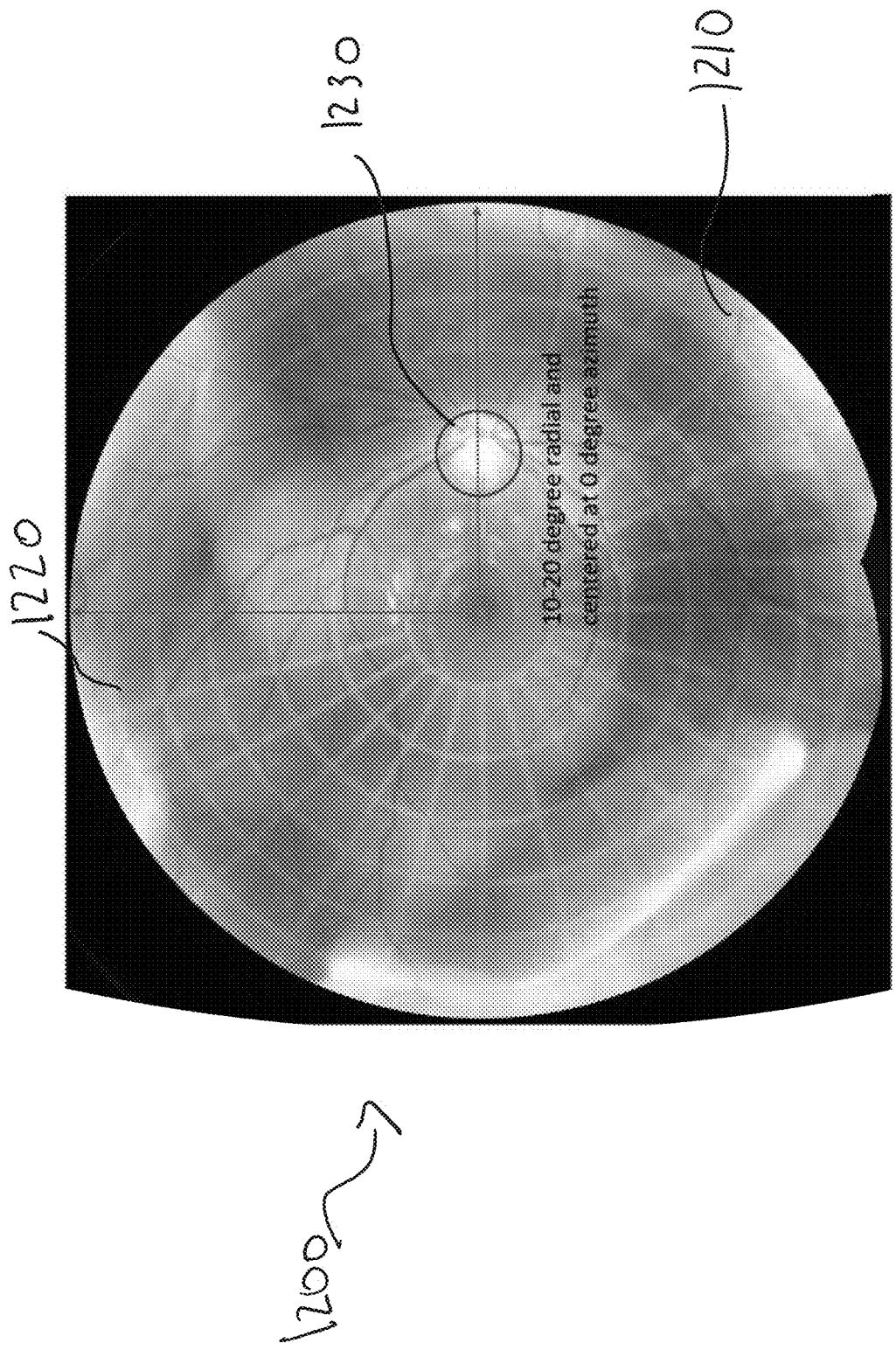
FIG. 12 illustrates an example of an overlaid image.

FIG. 12 illustrates an example of an overlaid image 1200, in accordance with one or more embodiments of the present disclosure. The overlaid image 1200 may represent a corrected and projected image 1210 of the actual eye, such as one of the images 1100a-1100d of FIGS. 11A-11D. The overlaid image 1210 may have grid lines 1220 overlaid on the image.

In some embodiments, the grid lines 1220 may be rendered to reflect the projection technique such that a user observing the image may have a better sense of the spherical nature of the image and the effects of the projection technique. In some embodiments, the grid lines 1220 may have some level of transparency, be placed behind certain color intensities of the projected image 1210, or any other image combination technique such that the grid line s1220 may be observed without obstructing the projected image 1210.

In some embodiments, the grid lines 1220 may be an image of the reference markings of the model of the eye used to generate the correction surface for the projection technique associated with the projected image 1210. By using such an image, if there are aberrations caused or unaddressed by the correction technique (for example, due to an unusually shaped or sized eye, such aberrations may be observable in the grid lines 1220, alerting the user of any potential issues in the correction.

In some embodiments, the grid lines 1220 may be radial lines, circumferential lines, or any other type or combination of reference markings that may be automatically generated and overlaid on the projected image 1210.

In some embodiments, by using the grid lines 1220, particularly when combined with certain projection techniques (such as equidistant projection), the sizes and/or locations of certain landmarks, disease elements, etc. may be characterized in a quantitatively consistent manner. For example, as illustrated in FIG. 12, an optic nerve hypoplasia (ONH) 1230 may be identified and quantified as being located at between 10-20 degrees radially and centered at approximately a zero degree azimuth. Additionally, a size of the ONH may be measured in an accurate and repeatable manner, which may facilitate tracking of potential eye diseases over time and determining the gravity of an eye disease.

In some embodiments, the overlaid image 1200 and/or the images 1100a-1100d of FIGS. 12 and 11A-11D, respectively, may be provided to a machine learning system to facilitate identification of certain landmarks, disease conditions, and/or other retinal features. In these and other embodiments, because of the consistency of the correction and projection, the machine learning system may have a better dataset from which the machine learning system may be trained. Additionally, because of the consistency of the correction and projection, the machine learning system may be more likely to provide accurate results when classifying or identifying features in images of eyes.

In some embodiments, to facilitate machine learning, the overlaid image 1200 and/or the images 1100a-1100d of FIGS. 12 and 11A-11D may be automatically sub-divided into smaller regions (such as the regions enclosed within the grid lines 1220). Each region may be rated based on the quality of the image in the region. For example, a numerical score representing a confidence in the accuracy of the representation in the region may be assigned to each region. In some embodiments, the regions may be separated into usable regions and/or non-usable regions for machine learning. In some embodiments, such separation may be based on the numerical score or other rating of the regions.

In some embodiments, the image correction processes and/or the preparation thereof described herein may include a computing device (not illustrated). Such a computing device may be configured to facilitate the performance of the operations described herein, such as capturing images, identifying portions of an image, applying correction algorithms, etc. Such a computing device may include a processor, a memory, etc. and may be in communication with and/or part of the multi-channel imaging system.

Generally, the processor may include any suitable special-purpose or general-purpose computer, computing entity, or processing device including various computer hardware or software modules and may be configured to execute instructions stored on any applicable computer-readable storage media. For example, the processor may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

It is understood that the processor may include any number of processors distributed across any number of networks or physical locations that are configured to perform individually or collectively any number of operations described herein. In some embodiments, the processor may interpret and/or execute program instructions and/or processing data stored in the memory. By interpreting and/or executing program instructions and/or process data stored in the memory, the device may perform operations, such as the operations performed by the retinal imaging device described in the present disclosure.

The memory may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. In these and other embodiments, the term "non-transitory" as used herein should be construed to exclude only those types of transitory media that were found to fall outside the scope of patentable subject matter in the Federal Circuit decision of In re Nuijten, 500 F.3d 1346 (Fed. Cir. 4007). In some embodiments, computer-executable instructions may include, for example, instructions and data configured to cause the processor to perform a certain operation or group of operations as described in the present disclosure.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method. For example, the dashed lines of the illumination paths and imaging paths are not meant to reflect an actual optical design, but are illustrative of the concepts of the present disclosure.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the term "about" or "approximately" should be interpreted to mean a value within 10% of actual value.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. A method of generating a correction algorithm, comprising:
    obtaining a model of an eye, the model of the eye including:
        a front portion comprising optics to mimic a cornea and a lens of a human eye; and
        a rear portion comprising a generally hemispherical-shaped body to mimic a retina of the human eye, the rear portion including physical reference lines on an inside surface of the generally hemispherical-shaped body;
    capturing images of the model of the eye using at least one image capturing device aimed at the model of the eye in which the at least one image capturing device is to be used when imaging an actual eye;
    identifying vertices of the physical reference lines according to a given projection technique for displaying generally hemispherical-shaped body in a two-dimensional image in the captured images;
    obtaining an idealized placement of the vertices of the physical reference lines according to the given projection technique;
    performing bilinear interpolation to determine a first surface for correcting any pixel in the two-dimensional image according to a first difference between the identified vertices in the captured images and the idealized placement in an x-axis, and a second surface for correcting any pixel in the two-dimensional image according to a second difference between the identified vertices in the captured images and the idealized placement in a y-axis; and
    storing the first surface and the second surface as part of the correction algorithm such that any pixel of an image captured according to how the image capturing device is to be used when imaging the actual eye is corrected using the first surface to adjust a given pixel in the x-axis and the second surface to adjust the given pixel in the y-axis.

2. The method of claim 1, further comprising:
    capturing human-eye images of the actual eye using at least one of a second set of image capturing devices;
    applying the correction algorithm to the human-eye images; and
    stitching together the corrected human-eye images to achieve a wide field of view image of the actual eye, the wide field of view image depicting a retina of the actual eye according to the projection technique.

3. The method of claim 1, further comprising:
    generating third and fourth surfaces based on a second projection technique; and
    storing the third and fourth surfaces as part of a second correction algorithm related to the second projection technique.

4. The method of claim 3, further comprising:
    capturing human-eye images of the actual eye using at least one of a second set of image capturing devices;
    applying the second correction algorithm to the human-eye images; and
    stitching together the human-eye images corrected using the second correction algorithm to achieve a wide field of view image of the actual eye, the wide field of view image depicting a retina of the actual eye according to the second projection technique.

5. The method of claim 1, further comprising:
    subdividing a corrected image of a human eye into smaller portions, the corrected image corrected using the correction algorithm;
    classifying the smaller portions for quality; and
    storing the classified smaller portions for later use in a machine-learning algorithm.

6. The method of claim 1, further comprising superimposing a partially transparent image of the rear portion of the model of the eye on a corrected image of a human eye, the corrected image corrected using the correction algorithm.

* * * * *